(12) United States Patent
Schrader

(10) Patent No.: US 8,293,441 B2
(45) Date of Patent: Oct. 23, 2012

(54) PIGMENT PREPARATIONS BASED ON DIOXAZINES

(75) Inventor: Klaus Schrader, Kelkheim (DE)

(73) Assignee: Clariant Finance (BVI) Limited, Tortola (VG)

( * ) Notice: Subject to any disclaimer, the term of this patent is extended or adjusted under 35 U.S.C. 154(b) by 224 days.

(21) Appl. No.: 12/667,626

(22) PCT Filed: Jun. 5, 2008

(86) PCT No.: PCT/EP2008/004522
§ 371 (c)(1),
(2), (4) Date: Jan. 4, 2010

(87) PCT Pub. No.: WO2009/003568
PCT Pub. Date: Jan. 8, 2009

(65) Prior Publication Data
US 2010/0196816 A1    Aug. 5, 2010

(30) Foreign Application Priority Data

Jul. 5, 2007   (DE) .......................... 10 2007 031 354

(51) Int. Cl.
*G03G 5/00* (2006.01)
*C08K 5/34* (2006.01)

(52) U.S. Cl. .................... 430/108.21; 430/114; 430/115; 524/90; 106/499; 106/500

(58) Field of Classification Search ............. 430/108.21, 430/114, 115; 524/90; 106/499, 500
See application file for complete search history.

(56) References Cited

U.S. PATENT DOCUMENTS

| | | | |
|---|---|---|---|
| 4,253,839 A | 3/1981 | Spietschka et al. | |
| 4,526,963 A | 7/1985 | Deur | |
| 4,986,852 A | 1/1991 | Dietz et al. | |
| 5,318,627 A | 6/1994 | Dietz et al. | |
| 5,662,739 A | 9/1997 | Urban et al. | |
| 5,746,820 A | 5/1998 | Urban et al. | |
| 5,958,129 A | 9/1999 | Urban et al. | |
| 6,302,923 B1 | 10/2001 | Hasemann | |
| 7,569,106 B2 | 8/2009 | Heubach et al. | |
| 7,686,883 B2 | 3/2010 | Kempter et al. | |
| 2007/0186804 A1* | 8/2007 | Heckmann et al. | 106/31.6 |
| 2008/0127861 A1 | 6/2008 | Heubach et al. | |
| 2009/0121202 A1* | 5/2009 | Kempter et al. | 252/586 |

FOREIGN PATENT DOCUMENTS

| | | |
|---|---|---|
| DE | 102005028106 | 1/2006 |
| EP | 0321919 | 6/1989 |
| EP | 0504923 | 9/1992 |
| EP | 0662497 | 7/1995 |
| EP | 0803544 | 10/1997 |
| EP | 0864613 | 9/1998 |
| WO | WO 2006/128539 | 12/2006 |

OTHER PUBLICATIONS

PCT International Search Report for PCT/EP2008/004522, Apr. 23, 2009.
English Translation of the International Preliminary Report on Patentability for PCT/EP2008/004522, Feb. 18, 2010.

* cited by examiner

*Primary Examiner* — Mark A Chapman
(74) *Attorney, Agent, or Firm* — Anthony A. Bisulca

(57) ABSTRACT

The invention relates to a pigment preparation characterized by a content of a) a dioxazine compound of Formula (I) as the basic pigment; and b) a dioxazine compound of the general Formula (II) as a pigment dispersing agent Q-[Y—X]$_m$ (II), wherein Q represents an m-valent group of the basic pigment of Formula (I), Y represents —(CR$^1$R$^2$)$_{x-}$, in which X is 1 to 6, and R and R$^2$ independently of one another represent hydrogen or C1 to C4 alkyl, X represents an imidazole group which is linked via a carbon atom to the Y bridging element, m has a numerical value between 1 and 4; and c) a resin component from the group of abietic acid, dehydroabietic acid, dihydroabietic acid tetrahydroabietic acid, levopimaric acid, dextropimaric acid, isodextropimaric acid, colophony resin, partially hydrogenated colophony resin, resin soaps of the aforementioned acids, and mixtures thereof.

10 Claims, No Drawings

PIGMENT PREPARATIONS BASED ON DIOXAZINES

Pigment preparations are combinations of base pigments and auxiliaries. The auxiliaries come in two categories: the category of pigmentary dispersants, i.e., pigments substituted with groups having a specific effect, and the category of nonpigmentary auxiliaries. Auxiliaries are added to pigments in order that their dispersion in application media, particularly in coatings, printing inks and liquid inks, may be facilitated and in order that the rheological and coloristic properties of the pigments may be improved.

In printing ink manufacture, the first step comprises converting the pigments into a color concentrate having a high pigment content (>15%). These color concentrates are then adjusted to the printing ink concentration (6-10%) to produce printing inks. The dioxazine colorants described in EP-A-0 321 919 and EP-A-0 504 923 are not fully satisfactory in the concentrate with regard to viscosity and storage stability. This leads to problems in printing ink manufacture and in the storage of color concentrates. Furthermore, a large amount of solvent, or dissolving and binding media is necessary to set the viscosity needed for the printing operation. This leads to diminished color strength for the printing ink.

The present invention has for its object to provide a violet colorant for use in liquid printing inks which overcomes the defects described above.

We have found that this object is achieved, surprisingly, by a pigment preparation composed of a combination of P.V. 23, resin acids or resin acid derivatives and specific pigmentary dispersants based on dioxazine compounds.

The present invention accordingly provides a pigment preparation comprising
a) a dioxazine compound of formula (I) as base pigment

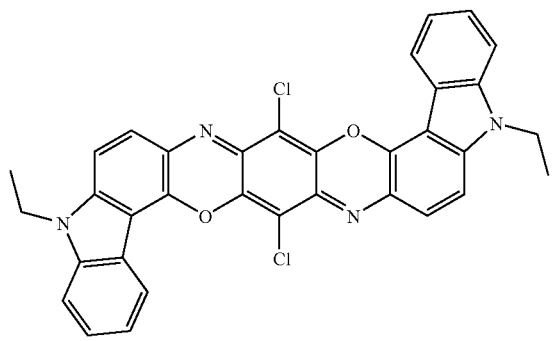

(I)

and
b) a dioxazine compound of formula (II) as a pigmentary dispersant $$Q\text{-}[Y\text{—}X]_m \qquad (II)$$

where
Q represents an m-valent residue of the base pigment of formula (I),
Y represents —$(CR^1R^2)_x$— where x is from 1 to 6 and $R^1$ and $R^2$ each independently represent hydrogen or $C_1$-$C_4$-alkyl,
X represents an imidazole radical attached to the bridge member Y via a carbon atom,
m represents a numerical value between 1 and 4, and
c) a resin component from the group consisting of abietic acid, dehydroabietic acid, dihydroabietic acid, tetrahydroabietic acid, laevopimaric acid, dextropimaric acid, isodextropimaric acid, rosin, partially hydrogenated rosin, resin soaps of the acids mentioned and mixtures thereof.

Preference is given to pigmentary dispersants of formula (II) where
Y represents methylene, ethylene or propylene,
X represents imidazolyl attached to the bridge member Y via position 5, and
m represents a number from 1 to 2.5.

Very particular preference for the purposes of the present invention is given to pigmentary dispersants of formula (III)

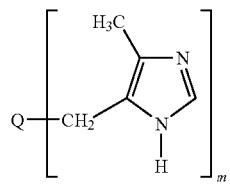

(III)

where
Q is as defined above, and
m represents a numerical value from 1 to 2.5 in particular 1 to 2.

Preferred resin components are commercially available rosin species and also salts of the acids mentioned, also known as resin soaps, wherein the cations are metal cations, preferably from the group consisting of alkali metals, alkaline earth metals, earth metals and transition metals, such as Cr, Mn, Fe, Co, Ni, Cu, Zn, Ag. Particular preference is given to Li, Na, K, Mg, Ca, Sr, in particular Na and K.

Preference is given to a pigment preparation comprising
a) 50% to 99.7% by weight, more preferably 80% to 99.7% by weight and most preferably 90% to 99.2% by weight of a base pigment of formula I,
b) 0.1% to 30% by weight, more preferably 0.1% to 10% by weight and most preferably 0.1% to 5% by weight of a pigmentary dispersant of formula II or III,
c) 0.1% to 30% by weight, more preferably 0.1% to 10% by weight and most preferably 0.1% to 5% by weight of the resin component,
all based on the overall weight of the pigment preparation.

The pigment preparations of the present invention, as well as the components mentioned, may contain still further customary auxiliaries or added substances, for example surfactants, dispersing agents, fillers, standardizers, resins other than those mentioned above, waxes, defoamers, antidusters, extenders, antistats, preservatives, drying retarders, wetting agents, antioxidants, UV absorbers and photostabilizers, preferably in an amount of 0.1 to 10% by weight, in particular 0.5 to 5% by weight, based on the overall weight of the pigment preparation. Useful surfactants include anionic or anion-active, cationic or cation-active and nonionic or amphoteric substances or mixtures thereof.

The present invention further provides a process for producing a pigment preparation which is in accordance with the present invention, which process comprises admixing C.I. Pigment Violet 23 with the pigmentary dispersant of formula (II) and the resin component before or during a conversion into a fine state of subdivision, for example a kneading, wet-grinding or dry-grinding operation, or immediately before or during conditioning treatment.

For example, the dry components can be mixed in granule or powder form before or after grinding; one component can be added to the other in moist or dry form, for example by mixing the components in the form of moist presscakes. Mixing can be accomplished for example by grinding in dry form, in moist form, for example by kneading, or in suspension, or by a combination of these methods. Grinding may be carried out in the presence of water, solvents, acids or grinding assistants such as salt. A kneading operation which leads to a fine state of subdivision of the pigment crystals is in particular a salt-kneading operation in the presence of an organic solvent.

It is particularly preferable to add the pigmentary dispersant and the resin component to the base pigment of formula I during wet grinding or in the course of a conditioning treatment. For example, the conditioning treatment can be effected in water and/or solvents and usually under elevated temperature, for example up to 200° C., and atmospheric or superatmospheric pressure. It will be readily understood that the pigmentary dispersant and the resin component can also be added in portions at different times.

Familiar drying assemblies can be used for drying a moist pigment preparation, such as drying cabinets, paddle-wheel dryers, tumble dryers, contact dryers and, in particular, spin-flash dryers and spray dryers.

The present invention also provides a pigment preparation that is obtainable by following the process described above.

The pigment preparations of the present invention are useful for pigmenting macromolecular organic materials of natural or synthetic origin, for example plastics, resins, coatings, paints, electrophotographic toners and developers, color filters and liquid inks, including liquid inkjet inks, and particularly for printing inks.

It emerged that, surprisingly, printing ink concentrates comprising a pigment preparation of the present invention have a distinctly better rheology when compared with a pigment preparation as described in EP-A-0 321 919 and EP-A-0 504 923, and do not thicken in storage.

More particularly, the pigment preparations of the present invention display excellent rheological properties even at high pigment contents (22% for example) of the printing ink concentrates. The alcohol- and ester-based printing inks produced from these printing ink concentrates produce prints of high transparency and gloss.

The pigment preparations of the present invention are further widely compatible in various other printing systems also.

The present invention also provides printing ink concentrates comprising 15% to 25% by weight, preferably 17% to 24% by weight, in particular 18% to 22% by weight of the pigment preparation of the present invention.

In the examples which follow, percentages are weight percent parts by weight, unless otherwise stated.

EXAMPLE 1 a) Conversion to a Fine State of Subdivision by Dry Grinding 30 g of coarsely crystalline crude pigment (Pigment Violet 23), prepared according to BIOS Final Report 960, page 75, are introduced into a cylindrical 1-liter plastics vessel filled with 1400 g of corundum grinding media 12 mm in diameter. The mixture is then finely ground for 4 hours while shaking on a swing mill. Thereafter, the millbase is sieved off from the grinding media. 29 g of millbase are obtained.

b) Conditioning

To 450 g of water and 336 g of millbase from P.V. 23 crude pigment of a) are added 112 g of a 5% solution of a partially hydrogenated rosin in aqueous sodium hydroxide solution and 250 g of isobutanol (85% strength). After stirring at 150° C. in an autoclave for several hours, 330 parts of a 3.8% aqueous suspension of the pigmentary dispersant of formula (III) where m is 1 are added and the solvent is distilled off.

c) Workup

Then, the batch is suction-filtered off hot. The product is washed salt-free and dried at 80° C. in vacuo and subsequently pulverized.

EXAMPLE 2

To 350 g of water and 336 g of millbase from P.V. 23 crude pigment of example 1a) are added 224 g of a 5% solution of a partially hydrogenated rosin in aqueous sodium hydroxide solution and 250 g of isobutanol (85% strength). After stirring at 150° C. in an autoclave for several hours, 330 parts of a 3.8% aqueous suspension of the pigmentary dispersant of formula (III) where m is 1 are added and the solvent is distilled off.

Then, the batch is suction-filtered off hot. The product is washed salt-free and dried at 80° C. in vacuo and subsequently pulverized.

The printing inks produced from the pigment preparations of the present invention are tested in NC gravure printing by test method PV 3/20 (Clariant International AG, Global Quality Assurance, July 2005) and show very good viscosity, thixotropy and storage stability (table 1):

TABLE 1

| | PV3/20 test results (rheology) | |
|---|---|---|
| Sample | 3 mm nozzle diameter efflux cup (45 ml of volume) efflux time [second] | Viscosity* at shear rate D = 200 s$^{-1}$ [mPa · s] |
| Example 1 | 13.9 | 116 |
| Example 2 | 15.2 | 116 |

*measured with rotary viscometer

EXAMPLE 3

252 g of Pigment Violet 23 dioxazine crude pigment are mixed with 1125 g of sodium chloride (<30 micrometers) in a laboratory kneader and kneaded with 230 ml of DMF at 50° C. for 8 h. The kneaded material is subsequently admixed with 11 000 g of 5% by weight hydrochloric acid, filtered off with suction and washed with ion-free water. The filtercake is pasted up in 500 ml of ion-free water and added at 60° C. with 85 g of an aqueous 5% solution of partially hydrogenated rosin in aqueous sodium hydroxide solution and with 105 g of a 9% aqueous suspension of the pigmentary dispersant of formula (III) where m is 1. The batch is subsequently filtered off hot with suction. The product is washed salt-free and dried at 80° C. in vacuo and subsequently pulverized.

What is claimed is:

1. A pigment preparation comprising a) a dioxazine compound of formula (I) as base pigment

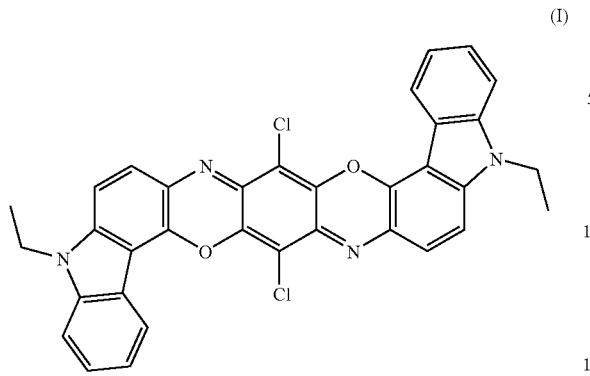

(I)

and b) a dioxazine compound of formula (II) as a pigmentary dispersant

Q-[Y—X]$_m$ (II)

wherein

Q is an m-valent residue of the base pigment of formula (I),

Y is $(CR^1R^2)_x$— where x is from 1 to 6 and $R^1$ and $R^2$ each independently are hydrogen or $C_1$-$C_4$-alkyl, X is an imidazole radical attached to the bridge member Y via a carbon atom, m is a numerical value between 1 and 4, and c) a resin component selected from the group consisting of abietic acid, dehydroabietic acid, dihydroabietic acid, tetrahydroabietic acid, laevopimaric acid, dextropimaric acid, isodextropimaric acid, rosin, partially hydrogenated rosin, resin soaps of the acids of abietic acid, dehydroabietic acid, dihydroabietic acid, tetrahydroabietic acid, laevopimaric acid, dextropimaric acid, isodextropimaric acid and mixtures thereof.

2. The pigment preparation as claimed in claim 1, wherein

Y is methylene, ethylene or propylene,

X is imidazolyl attached to the bridge member Y via position 5, and m is a number from 1 to 2.5.

3. The pigment preparation as claimed in claim 1, comprising a pigmentary dispersant of formula (III)

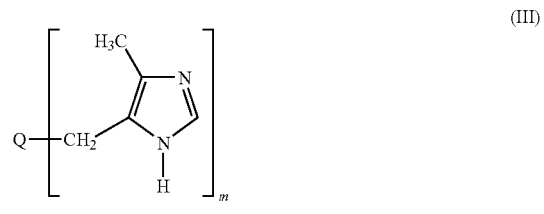

(III)

wherein

Q is as defined in claim 1, and m is a numerical value from 1 to 2.5.

4. The pigment preparation as claimed in claim 1, comprising a) 50% to 99.7% by weight of a base pigment of formula I, b) 0.1% to 30% by weight of a pigmentary dispersant of formula II or III, c) 0.1% to 30% by weight of the resin component, all based on the overall weight of the pigment preparation.

5. The pigment preparation as claimed in claim 1, comprising a) 80% to 99.7% by weight of a base pigment of formula I, b) 0.1% to 10% by weight of a pigmentary dispersant of formula II or III, c) 0.1% to 10% by weight of the resin component, all based on the overall weight of the pigment preparation.

6. A process for producing a pigment preparation as claimed in claim 1, comprising the step admixing C.I. Pigment Violet 23 of formula (I) with the pigmentary dispersant of formula (II) and the resin component before or during a conversion into a fine state of subdivision or immediately before or during a conditioning treatment.

7. A pigmented macromolecular organic materials of natural or synthetic origin comprising a pigment preparation as claimed in claim 1.

8. The pigmented macromolecular organic materials of natural or synthetic origin as claimed in claim 7, wherein the pigmented macromolecular organic materials of natural or synthetic origin are plastics, resins, coatings, paints, electrophotographic toners, electrophotographic developers, color filters or liquid inks.

9. An inkjet ink or printing ink comprising a pigment preparation as claimed in claim 1.

10. A printing ink concentrate comprising 15% to 25% by weight of the pigment preparation as claimed in claim 1.

* * * * *